United States Patent
Lucidera

(10) Patent No.: US 10,753,502 B2
(45) Date of Patent: Aug. 25, 2020

(54) CIRCUIT SHUT-OFF SOLENOID VALVE FOR A SOLENOID VALVE SYSTEM AND SOLENOID VALVE SYSTEM COMPRISING SAID SHUT-OFF SOLENOID VALVE

(71) Applicant: METAL WORK S.p.A., Concesio (IT)

(72) Inventor: Marco Lucidera, Concesio (IT)

(73) Assignee: Metal Work S.p.A., Concesio (BS) (IT)

( * ) Notice: Subject to any disclaimer, the term of this patent is extended or adjusted under 35 U.S.C. 154(b) by 109 days.

(21) Appl. No.: 16/016,847

(22) Filed: Jun. 25, 2018

(65) Prior Publication Data
US 2019/0003610 A1 Jan. 3, 2019

(30) Foreign Application Priority Data
Jun. 28, 2017 (IT) .................. 102017000072532

(51) Int. Cl.
| | |
|---|---|
| F16K 11/07 | (2006.01) |
| F16K 31/06 | (2006.01) |
| F16K 27/00 | (2006.01) |
| F16K 37/00 | (2006.01) |
| F16K 17/04 | (2006.01) |
| G05D 7/06 | (2006.01) |

(52) U.S. Cl.
CPC ...... *F16K 31/0613* (2013.01); *F16K 11/0716* (2013.01); *F16K 17/044* (2013.01); *F16K 27/003* (2013.01); *F16K 37/0041* (2013.01); *G05D 7/0629* (2013.01)

(58) Field of Classification Search
CPC ............. F16K 31/0613; F16K 11/0716; F16K 17/044; F16K 27/003; F16K 37/0041; Y10T 137/86614; Y10T 137/86702; Y10T 137/8671

See application file for complete search history.

(56) References Cited

U.S. PATENT DOCUMENTS

| | | | |
|---|---|---|---|
| 6,026,856 A * | 2/2000 | Miyazoe | F15B 13/0402 137/596.16 |
| 6,186,161 B1 | 2/2001 | Hiramatsu | |
| 2006/0237068 A1* | 10/2006 | Miyazoe | F15B 13/0431 137/596.16 |
| 2006/0283509 A1* | 12/2006 | Narita | F15B 13/0814 137/596.16 |
| 2009/0212247 A1* | 8/2009 | Inaba | F15B 13/0839 251/129.15 |
| 2014/0116551 A1 | 5/2014 | Smith | |

FOREIGN PATENT DOCUMENTS

WO 2016/208521 A1 12/2016

OTHER PUBLICATIONS

Search Report dated Apr. 18, 2018, for corresponding Italian Patent Application No. 2017000072532.

* cited by examiner

*Primary Examiner* — Kelsey E Cary
(74) *Attorney, Agent, or Firm* — Morgan, Lewis & Bockius LLP

(57) ABSTRACT

A circuit shut-off solenoid valve for a solenoid valve system can be directly integrated in a solenoid valve system without use of an auxiliary base module and can be interchangeable with any solenoid valve in the system. The circuit shut-off solenoid valve allows for modification of the flow rate of compressed air into the solenoid valve.

13 Claims, 11 Drawing Sheets

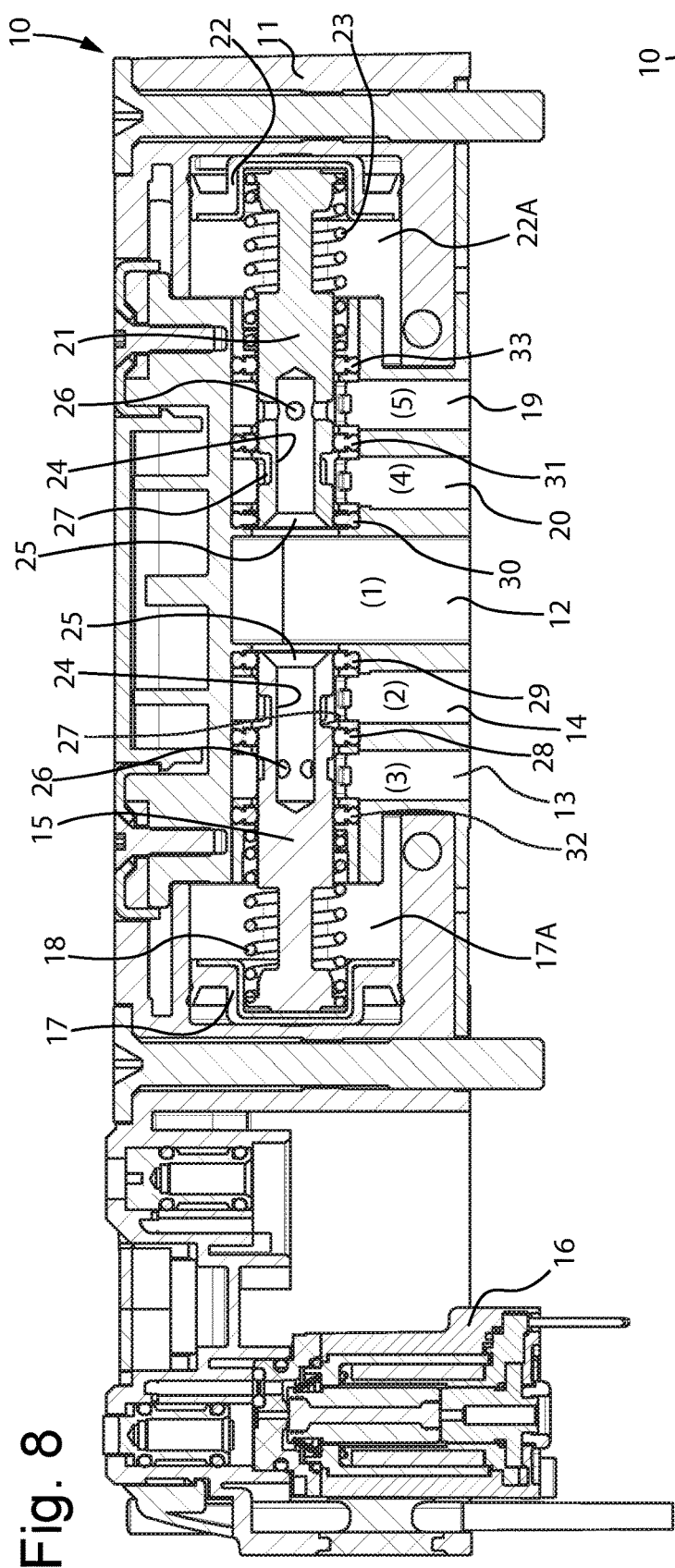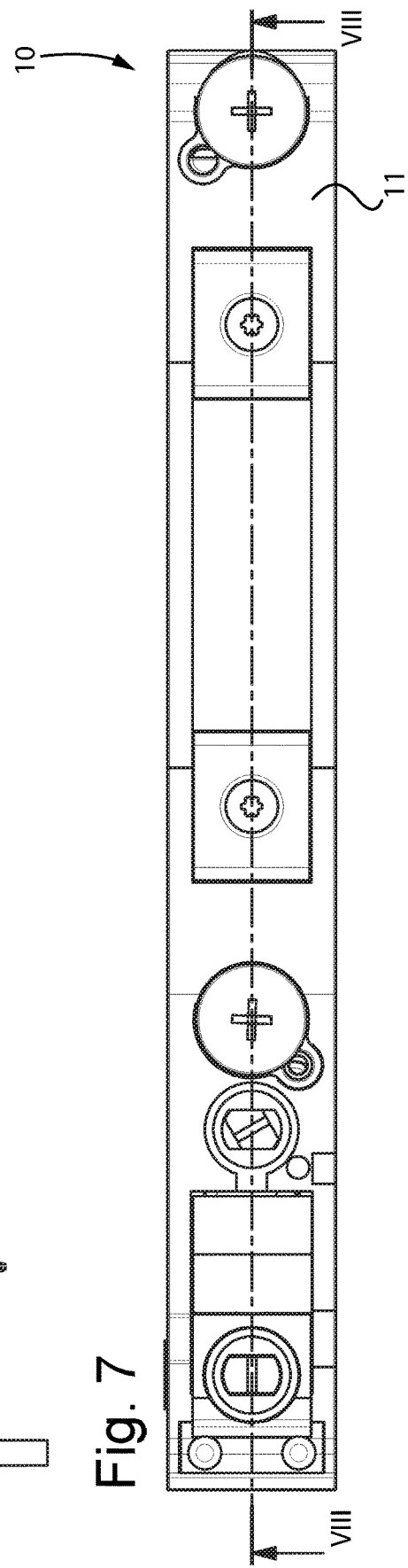

CIRCUIT SHUT-OFF SOLENOID VALVE FOR A SOLENOID VALVE SYSTEM AND SOLENOID VALVE SYSTEM COMPRISING SAID SHUT-OFF SOLENOID VALVE

BACKGROUND

The present invention relates to a shut-off solenoid valve of the circuit defined by a solenoid valve system.

The present invention further relates to a solenoid valve system comprising said circuit shut-off solenoid valve.

The term "solenoid valve system" indicates a set of two or more solenoid valves assembled on one or more bases mutually connected to form an assembly, which assembly in turn is connected to at least one head element or module.

In the jargon of the sector, such a solenoid valve system is generally indicated as "solenoid valve island" or "solenoid valve battery".

In more detail, a solenoid valve system comprises:
two or more solenoid valves,
one or more bases, generally of the modular type, which are removably fastened to each other,
at least one head element or module connected and fastened to an end of the base or of the assembly of bases.

Each solenoid valve is generally of the spool type comprising:
a body, in which a plurality of mouths is obtained within which passes the flows of the pressurised fluid (air); the mouths comprise, in general, at least one feeding mouth, i.e. a mouth that has to be connected to the supply of pressurised fluid, at least one utilisation or outlet mouth, i.e. a mouth through which the pressurised fluid is sent to another apparatus, and at least one discharge mouth, i.e. a mouth from which the pressurised fluid, after it was utilised, is discharged or is returned into the atmosphere;
a movable element generally consisting of a spool-type slider or piston, which is slidably housed in a cylindrical seat obtained in the body and is configured to connected selectively to each other the various mouths, forcing the flow of the pressurised fluid to follow determined paths;
a plurality of gaskets interposed between the movable element and the body to assure fluid tightness and selectively isolating the mouths which, in each of the positions assumed by the distributor, must not be passed through by the flow of the pressurised fluid;
an actuation device or pilot command, which is generally of the electrical or electro-pneumatic type, which drives, directly or indirectly, the movement of the movable element to switch the distributor from the resting position to at least one working position; generally, the pilot command device consists of a combined command by means of a solenoid and pilot distributor and comprises a pneumatic actuator (for example a piston integral with the movable element) arranged to directly move the movable element and an electropilot consisting of a solenoid which, as a result of energisation and de-energisation, moves a core that opens and closes ducts that feed and discharge compressed air for the driving of the pneumatic actuator;
a repositioning device, for repositioning the movable element and, hence, the switching of the distributor from at least one working position to the resting position; the repositioning device can be external (pneumatic, electrical, electro-pneumatic) or internal (pneumatic or mechanical).

The solenoid valves can comprise one or more (generally two) spool distributors housed in the same body. Spool distributors can be of one of the types that, according to the unified classification, is classified, by way of example, as "3/2", "5/2" or "5/3".

Each base consists of a body in which are obtained one or more housings, each of which is configured to receive a respective solenoid valve and is provided with ducts for the passage of pressurised fluid that are connected with the corresponding mouths of the respective solenoid valve. In addition, in the base are defined the feeding and discharge ducts of the pressurised fluid which command the pneumatic actuators acting on the movable element of each solenoid valve.

Each housing obtained in the base is provided with: at least one feeding duct, at least one outlet or delivery duct and at least a discharge duct, which are connected respectively with the at least one feeding mouth, the at least one utilisation or outlet mouth and the at least one discharge mouth of the respective solenoid valve.

The base or, if the base is divided in two or more sections, each of which section operates at a different pressure and is provided with a respective feeding and discharge module, each section or portion thereof is then traversed by:
at least one main feeding duct that joins or otherwise defines the at least one feeding duct of each individual housing, the main feeding duct of the base (or of each section thereof) is a common duct that serves all the housings of the base (or of each section thereof),
at least one main discharge duct that joins or otherwise defines the at least one discharge duct of each individual housing, the main discharge duct of the base (or of each section thereof) is a common duct that serves all the housings of the base (or of each section thereof).

The at least one outlet or delivery duct of each housing of the base, instead, is distinct and separate from the outlet or delivery ducts of the remaining housings obtained in the base (or of each section thereof) and ends in a respective delivery opening that is accessible from the exterior of the base and that is connectable to a respective user (for example a pneumatic actuator) slaved to the corresponding solenoid valve.

The base is then provided with an electric or electronic circuit (for example an electronic board) and of related connecting means for the electric connection with the devices for the electric or electropneumatic actuation and/or repositioning of each solenoid valve, the connecting means branching off at each housing of the base.

Each solenoid valve is removably fastened to the base with known fastening members, e.g. of the screw type.

The bases are generally modular and can be mutually coupled and fastened removably with known fastening members, for example tie rods.

The head or intermediate element or module (i.e. local to each base section), or the head or intermediate feeding and discharge element or module, comprises a body in which are obtained:
at least a first joining duct that joins, at one end, with the at least one main feeding duct of the base (or of the corresponding base section) and which, at the opposite end, can be joined with a source of pressurised fluid,
at least a second joining duct that joins, at one end, with the at least one main discharge duct of the base (or of the corresponding base section) and that, at the opposite end, ends in a discharge opening,
an electric or electronic input module provided with at least one input connector, which is able to receive command signals imparted from outside the solenoid valve system, and an output connector, which is connectable to the corresponding input connector of the electric or electronic circuit of the base to transmit the command signals to it.

If the base is modular, each base module comprises an input connector and an output connector, coupleable respectively with the output connector of the head element or of the previous base module and with the input connector of the subsequent base module for the transmission of the command signals from the electric or electronic input module to the electric or electronic circuits of the various base modules.

The solenoid valve system can be completed by an end element positioned at the end of the base that is opposite to the one connected to the head element.

Known solenoid valve systems are for example described in WO2017/017650A1, WO2017/017653A1 and WO2017/017656A1.

FIG. 1 is an exploded view of a solenoid valve system according to the prior art; FIG. 2 shows a section of the solenoid valve system of FIG. 1 in which the solenoid valve comprises two "3/2" spool distributors normally closed housed in the same body; FIG. 3 schematically shows the pneumatic circuit of the solenoid valve system of FIG. 1.

With reference to these figures, the numeral 100 indicates a solenoid valve system comprising a modular base formed by at least one or two base modules 101, 102 coupled together and fastened between a head element or module 103 and an end element 104.

The head element or module 103, the two base modules 101, 102 and the end element 104 are mutually connected to form an assembly by means of fastening members of the tie-rod type 105.

Each base module 101, 102 is provided with a plurality of housings 106, each able to receive a respective solenoid valve 107, which can be fastened to the respective base module 101, 102 by means of screws.

Each solenoid valve 107 is of the spool type and, with reference to FIG. 2, it consists, for example, of a pair of "3/2" spool distributors, normally closed, housed in a same body 108.

Each solenoid valve 107 comprises:
a body 108, in which are obtained at least one feeding mouth 109, at least a first outlet mouth 110 and at least a first discharge mouth 111, at least a first spool-type slider 114, which is housed movably with alternate rectilinear motion in a seat obtained in the body 108 and it is configured to place selectively in fluid connection the at least one feeding mouth 109, the at least a first discharge mouth 111 and the at least a first outlet mouth 110,
at least a first actuation device of the first spool-type slider 114, which actuation device comprises, for example, at least a first electropilot 116 that commands a first actuating piston 117 integral with the first spool-type slider 114, and
at least a first repositioning device for example of the mechanical type and consisting of a first spring 120.

Each solenoid valve 107 can also comprise:
at least a second outlet mouth 112 and at least a second discharge mouth 113, at least a second spool-type slider 115, which is housed movably with alternate rectilinear motion in a seat obtained in the body 108 and it is configured to place selectively in fluid connection the at least one feeding mouth 109, the at least a second discharge mouth 113 and the at least a second outlet mouth 112,
at least a second actuation device for actuating the second spool-type slider 115, which actuation device comprises, for example, at least a second electropilot 118 which commands a second actuating piston 119 integral with the second spool-type slider 115, and
at least a second repositioning device for example of the mechanical type consisting of a second spring 121.

The feeding mouth 109, the first outlet mouth 110, the first discharge mouth 111, the second outlet mouth 112 and the second discharge mouth 113 of each solenoid valve 107 are all defined in the body 108 and are mutually aligned at the attachment face of the solenoid valve 107 to the respective housing 106 (the feeding mouth 109 is at the centre, at its sides are symmetrically positioned the first and the second outlet mouths 110 and 112, to the side of each of which is positioned respectively the first discharge mouth 111 and the second discharge mouth 113).

Between the body 108, the first spool-type slider 114 and the second spool-type slider 115 are interposed gaskets to provide a seal for the pressurised fluid.

With reference to FIG. 2, the first spool-type slider 114 has a portion with reduced diameter shaped so as to put the first outlet mouth 110 alternatively in communication with the first discharge mouth 111 and with the feeding mouth 109 following the movement of the first spool-type slider 114. Similarly, the second spool-type slider 115 has a portion with reduced diameter so shaped as to put the second outlet mouth 112 alternatively in communication with the second discharge mouth 113 and with the feeding mouth 109 following the movement of the second spool-type slider 115.

The base, or each base module 101, 102 comprises a plurality of housings 106 each of which is able to receive a respective said solenoid valve 107.

Each housing 106 comprises:
at least one feeding duct 122 adapted to be put in fluid connection with the feeding mouth 109 of the respective solenoid valve 107,
at least a first discharge duct 125 adapted to be put in fluid connection with the first discharge mouth 111 of the respective solenoid valve 107 and
at least a first outlet duct 123 adapted to be put in fluid connection with the first outlet mouth 110 of the respective solenoid valve 107.

Each housing 106 further comprise:
at least a second discharge duct 126 adapted to be put in fluid connection with the second discharge mouth 113 of the respective solenoid valve 107 and
at least a second outlet duct 124 able to be put in fluid communication with the second outlet mouth 112 of the respective solenoid valve 107.

The feeding duct 122, the first and the second outlet ducts 123 and 124 the first and second discharge ducts 125 and 126 of each housing 106 are all defined in the body of the respective base module 101, 102 with disposition and alignment corresponding to those of the respective mouths of the solenoid valves 107 coupleable therewith.

The feeding ducts 122 of the housings 106 are joined to or defined by a segment of a main feeding duct 122*a* obtained in the base, or in the base modules 101, 102, and common to all housings 106.

The first discharge ducts 125 of the housings 106 are joined to or defined by a segment of a first main discharge duct 125A obtained in the base or in the base modules 101, 102, and common to all housings 106.

The second discharge ducts 126 of the housings 106 are joined to or defined by a segment of a second main discharge duct 126A obtained in the base or in the base modules 101, 102, common to all housings 106.

The first outlet ducts 123 of the housings 106 each come out in a respective first delivery opening 123A which can be associated with a user U.

The second outlet ducts 124 of the housings 106 each come out in a respective second delivery opening 124A which can be associated with a user U.

The first outlet ducts 123 and the second outlet ducts 124 of the various housings 106 are distinct and separate from each other.

Each base module further comprises a respective electronic board 200 and electric connection means for connecting the electronic board with the devices for the electric or electro-pneumatic actuation and/or repositioning of each solenoid valve 107.

In the case shown in FIG. 2, the electronic board 200 is connected to the first electropilot 116 and to the second electropilot 118.

The head element or module 103, also called feeding module, comprises a body in which are obtained:

a first joining duct 127 that joins, at one end, with the at least one main feeding duct 122A of the base module 101, 102 directly coupled therewith and that, at the opposite end, can be joined with a source of pressurised fluid S; FIG. 1 shows the junction 127A schematically coupled to the source of pressurised fluid S;

a pair of second joining ducts 128 and 129 join, at one end, respectively with the first main discharge duct 125A and with the second main discharge duct 126A of the base module 101, 102 directly coupled therewith and, at the opposite end, they end in a common discharge opening 130 or alternatively in a respective separate discharge opening, an electronic input module 131 provided with at least one input connector to receive command signals from outside the solenoid valve system and an output connector connectable to the corresponding input connector of the electronic board 200 of the base module 101, 102 directly connected thereto.

In FIG. 3, the mouths of each solenoid valve 107 are also indicated with the unified numbering shown in brackets, according to which: "1" designates the feeding mouth, i.e. the one that is usually fed with the pressurised fluid coming from the respective feeding duct obtained in the base module, "2" and "4" designate the outlet mouths, i.e. the ones that, usually, send the pressurised fluid to the users U connected to the respective outlet or delivery ducts obtained in the corresponding base module, "3" and "5" designate the discharge mouths, i.e. the mouths through which the fluid returning from the users is discharged.

In this figure, moreover, each solenoid valve 107 is designated simply with a rectangle, without showing the respective resting and working positions according to the unified symbology. The possible ducts for feeding and discharging air to the electropneumatic actuation/repositioning devices are also not indicated.

The shape of each solenoid valve 107, known in itself and of the type for the example of the one shown in FIG. 2, is described in general terms solely for the purpose of making the present description clearer.

It must be noted that each solenoid valve 107 could be of a type different from the one shown in FIG. 2; thus for example the solenoid valve 107 could be of one of the known types "3/2", "5/2" or "5/3", the first spool-type slider and the second spool-type slider could be integrated in a single spool-type slider, the actuation and repositioning devices could be different from those described above, for example they could both be electropneumatic (electropilot combined with actuating piston slaved thereto).

Some applications require the presence of a shut-off valve, or better yet of a shut-off solenoid valve that allows to make the circuit formed by the entire solenoid valve system independent from the general network or better yet from the source feeding pressurised fluid S.

Such a shut-off solenoid valve generally has two positions:

a closed position, in which it prevents the entry of the pressurised air coming from the feeding source S in the circuit formed by the solenoid valve system, putting the latter in discharge, and a working position, in which it allows the entry of the compressed air coming from the feeding source S in the entire circuit formed by the solenoid valve system.

Such a shut-off solenoid valve is particularly useful if maintenance work on the solenoid valve system becomes necessary.

According to the prior art, such a shut-off solenoid valve is positioned upstream of the solenoid valve system and it consists of a "3/2" shut-off solenoid valve which is joined and connected to the solenoid valve system upstream thereof.

According to another prior art solution, such a shut-off valve is integrated in the treatment unit for treating the pressurised air coming from the feeding source S; for example, it is integrated in a filter and pressure regulator unit which is connected upstream of the solenoid valve system.

Integrating a shut-off solenoid valve in the same solenoid valve system is also known. According to this prior art, the shut-off solenoid valve is "3/2" and it is connected to an auxiliary base module, which is dedicated thereto and it is interposed between the base and the head module of the solenoid valve system. If the base is divided into different sections operating at different pressures and each provided with a respective inlet (feeding and discharge) module, each section is provided with a respective "3/2" shut-off solenoid valve which is connected to an auxiliary base module dedicated thereto and interposed between the base section and the respective head (feeding and inlet) module.

Such a known solution is schematically shown in FIG. 4, which reproduces the diagram of FIG. 3 with the addition of the shut-off solenoid valve 300 and of the respective auxiliary base module 301 dedicated thereto. It is noted that the shut-off solenoid valve 300 is positioned upstream of the base 101, 102 of solenoid valves 107 so as to be able to make the circuit downstream thereof independent of the feeding source S of compressed air, fully putting it in discharge.

Such a known solution makes it possible to reduce the overall dimensions and to simplify the pneumatic connections with respect to the other known solutions, described above. It also makes it possible to command the shut-off solenoid valve 300 through the same inlet module, be it with multipolar cable or with serial connection, of the solenoid valve system.

However, such a known solution has some drawbacks.

A first drawback is that it requires the construction of an auxiliary base module dedicated thereto. As is readily apparent just from the diagram of FIG. 4, such an auxiliary base module differs from the base modules 101, 102 of the solenoid valve system at least with regard to the shape of the main feeding duct. In this auxiliary base module 301, the main feeding duct necessarily consists of two separate branches: a first branch 322A which connects the outlet mouth (2) of the shut-off solenoid valve 300 to the main feeding duct 122A of the subsequent base modules 101, 102 and a second branch 322B that connects the feeding mouth (1) of the shut-off solenoid valve 300 to the first joining duct 127 of the head module 103 that is connected at the inlet with the feeding source S.

As is immediately understandable for the person skilled in the art, the base modules 101, 102 of the solenoid valve system instead have a single main feeding duct (designated with the numeral 122A in FIG. 3) passing through them and which is common to all housings 106, or that serves each housing 106.

Only in this way, when the shut-off solenoid valve 300 is in resting position the entire circuit downstream thereof, also comprising the main feeding duct 122A, is in discharge; when, instead, the shut-off solenoid valve 300 is in the working position, the compressed air fed by the feeding source S into the head module 103 is fed to the entire circuit downstream of the shut-off solenoid valve 300.

The need to have an auxiliary base module different from the base modules of the solenoid valve system entails, obviously, higher production costs, a complication of the mounting and dismounting operations and in any case greater overall dimensions of the solenoid valve system.

An additional drawback of this known solution is that the shut-off solenoid valve can be mounted only in fixed position between the head module and the base of the solenoid valve system.

In addition, it has to be dimensioned according to the maximum flow rate of the air necessary for the operation of the solenoid valve system.

SUMMARY

The aim of the present invention is to provide a circuit shut-off solenoid valve for a solenoid valve system and a solenoid valve system comprising said shut-off solenoid valve that make it possible to overcome the drawbacks of the prior art.

Within this general aim, a particular aim of the present invention is to provide a circuit shut-off solenoid valve for a solenoid valve system that can be directly integrated in a solenoid valve system which may be of a known type without any need to use an auxiliary base module dedicated thereto, with consequent containment of the production costs, simplification of the mounting and dismounting operations and containment of the overall dimensions of the solenoid valve system.

Yet another aim of the present invention is to provide a circuit shut-off solenoid valve for a solenoid valve system that is interchangeable with any of the solenoid valves of the solenoid valve system and can be directly mounted in any position of the base of the solenoid valve system.

Still another aim of the present invention is to provide a circuit shut-off solenoid valve for a solenoid valve system that makes it possible to modify in a simple manner the flow rate of compressed air into the solenoid valve system.

Another aim of the present invention is to provide a solenoid valve system comprising a shut-off solenoid valve integrated therein, compact and easily configurable according to different application need.

These and other aims according to the present invention are achieved with a circuit shut-off solenoid valve for a solenoid valve system and with a solenoid valve system comprising a circuit shut-off solenoid valve, as set forth in the accompanying claims.

BRIEF DESCRIPTION OF THE DRAWINGS

The features and the advantages of a circuit shut-off solenoid valve for a solenoid valve system and of a solenoid valve system comprising said shut-off solenoid valve according to the present invention will become more readily apparent from the following exemplifying and non-limiting description, referred to the accompanying drawings in which:

FIG. 7 is a top plan view of a possible embodiment of a shut-off solenoid valve according to the present invention;

FIG. 8 is a section view according to the plane VIII-VIII of FIG. 7 showing the shut-off solenoid valve in resting or non-actuated position;

DETAILED DESCRIPTION

Figure 1:
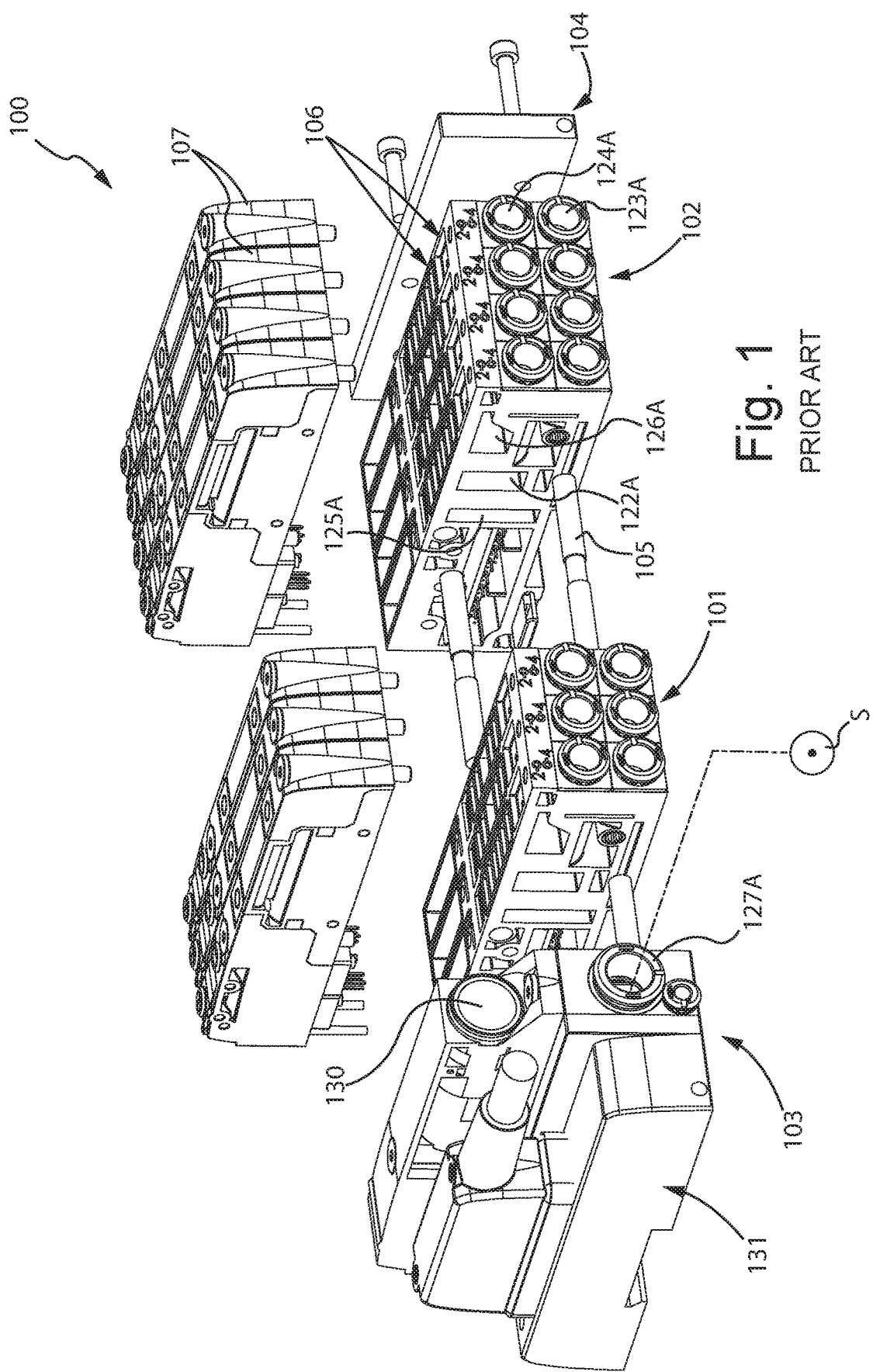
FIG. 1 is an exploded view of a solenoid valve system according to the prior art.

In the accompanying figures, the reference numeral 10 designates a shut-off solenoid valve of the pneumatic circuit of a solenoid valve system 100'.

The solenoid valve system 100' and the related pneumatic circuit, without the shut-off solenoid valve 10 according to the present invention, are known to the person skilled in the art and are described in general terms for the purposes of the definition of the present invention.

Figure 2:
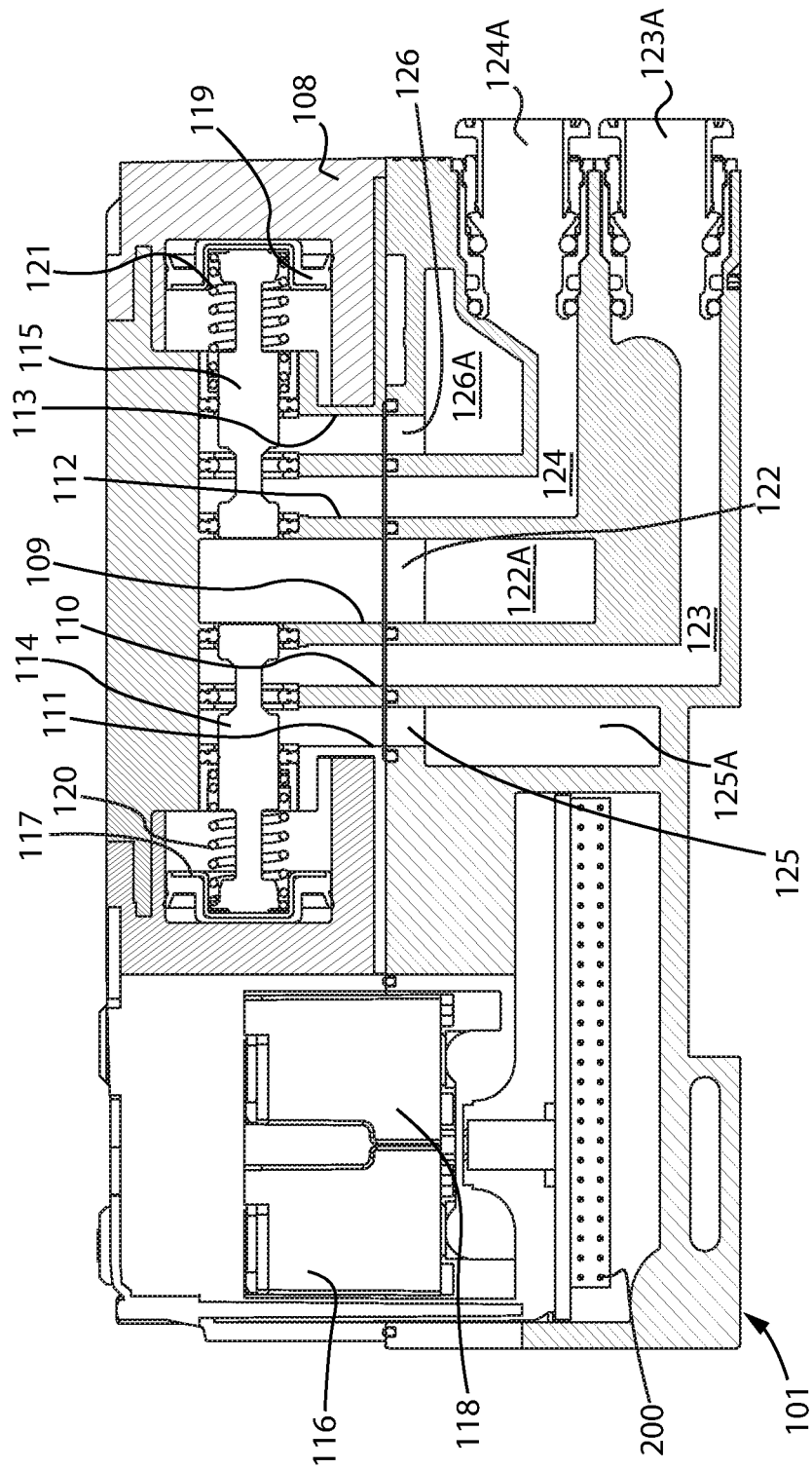
FIG. 2 is a section view of a solenoid valve system according to the prior art, showing a solenoid valve comprising two spool distributors of the "3/2" type housed in a same body.
Figure 3:
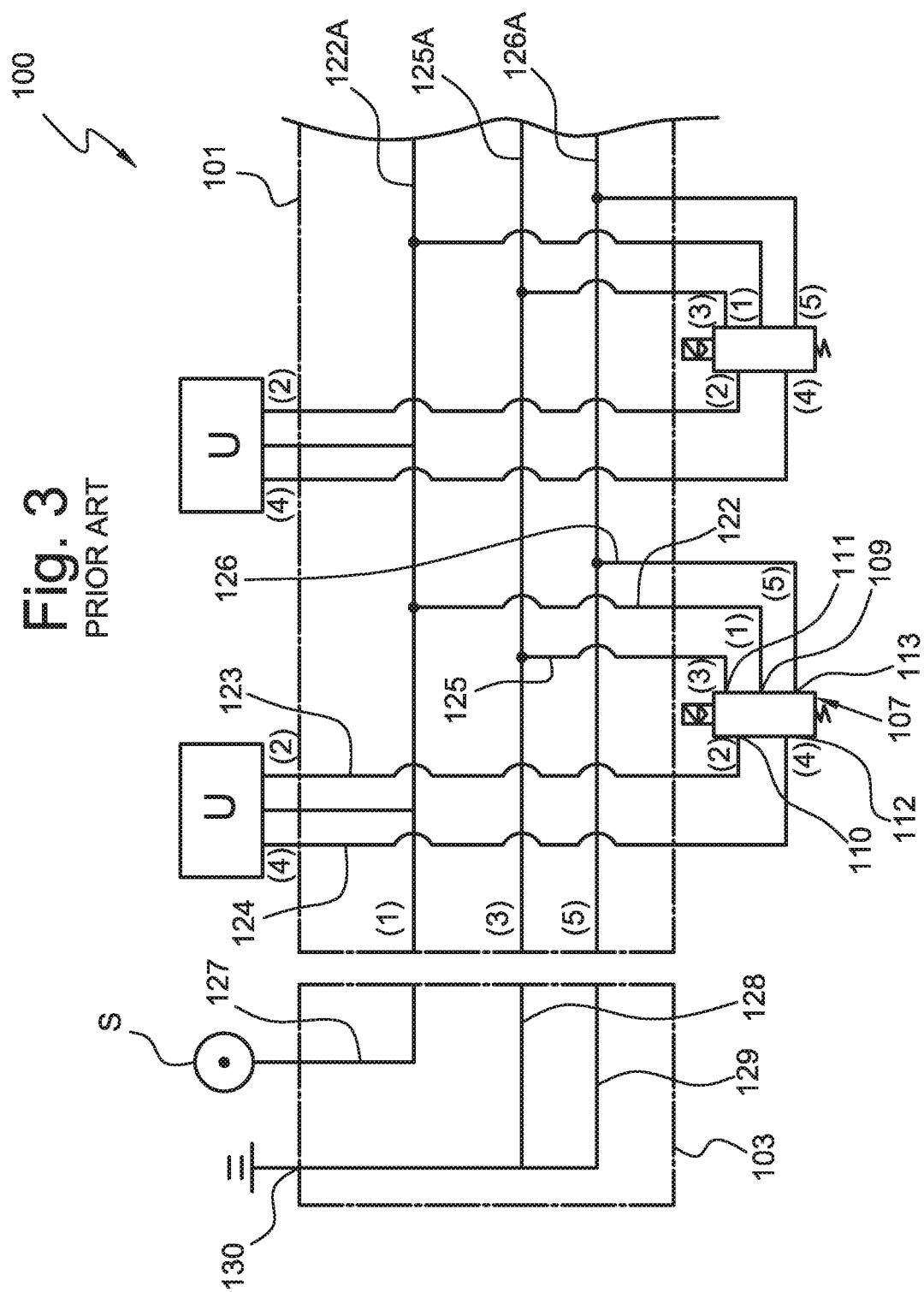
FIG. 3 is a schematic diagram of the pneumatic circuit corresponding to the solenoid valve system of FIG. 1.
Figure 4:
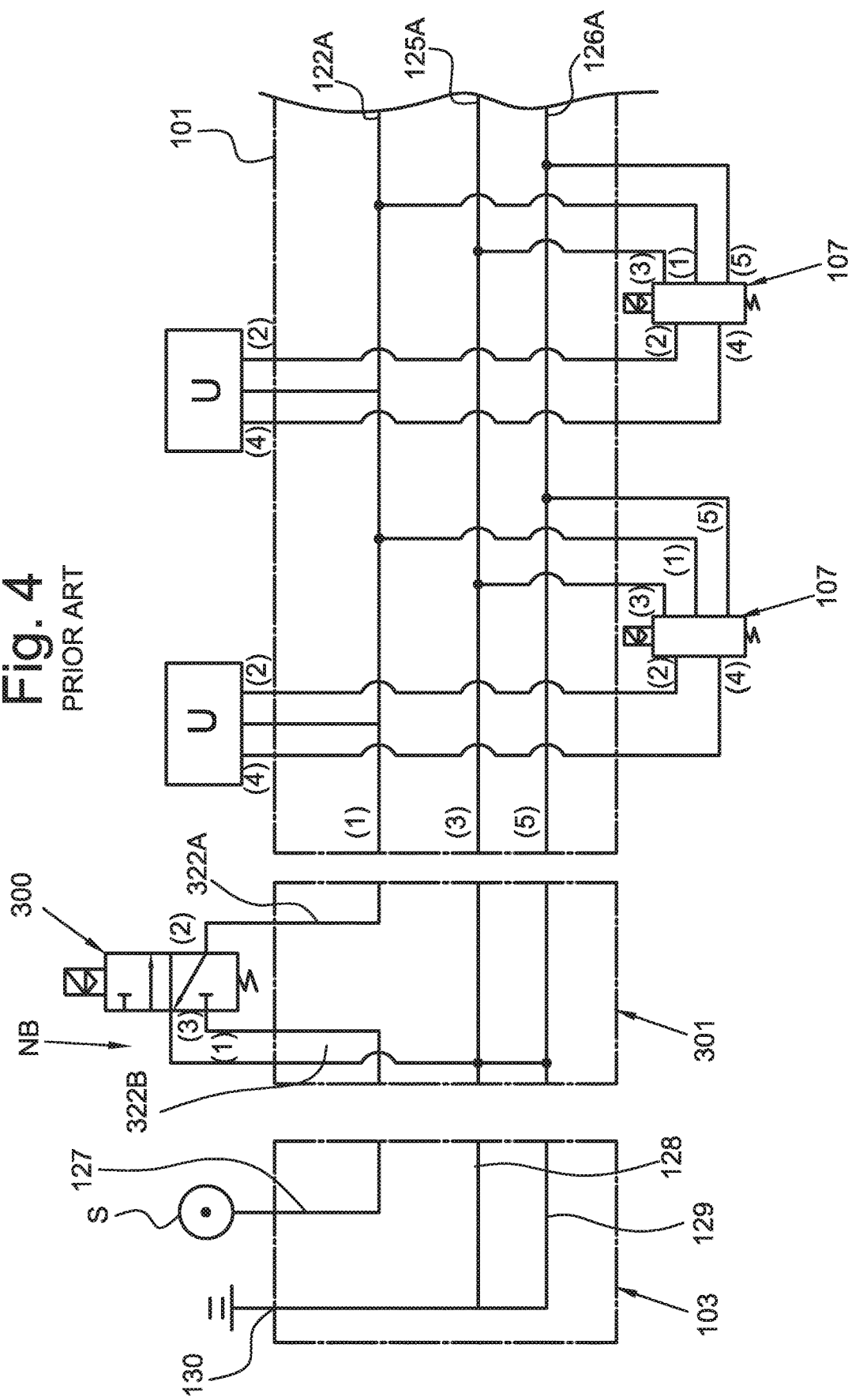
FIG. 4 is a schematic diagram of the circuit of a solenoid valve system like the one of FIG. 1 including a "3/2" shut-off solenoid valve according to the prior art.
Figure 10:
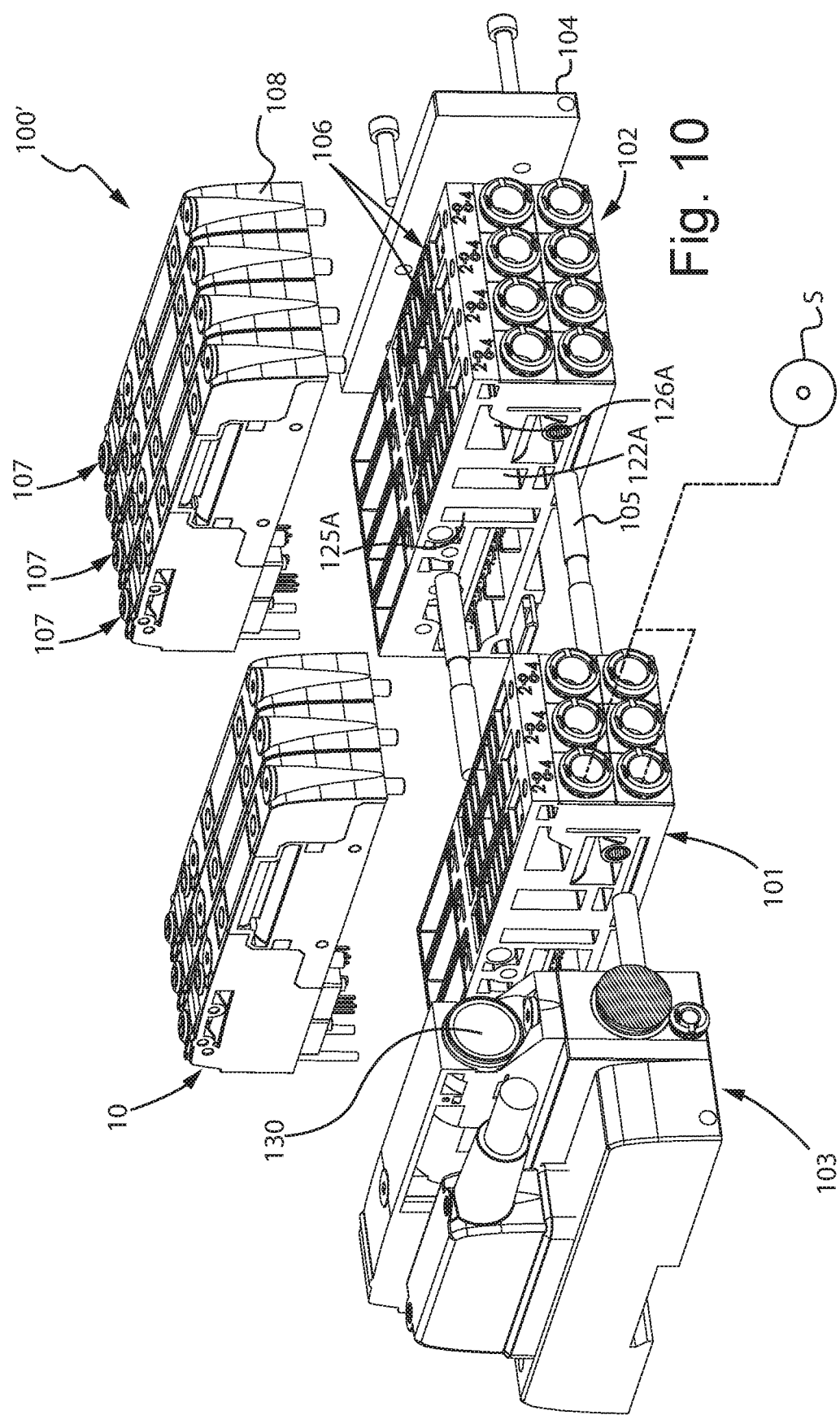
FIG. 10 is an exploded view of a solenoid valve system including a shut-off solenoid valve according to the present invention.
Figure 11:
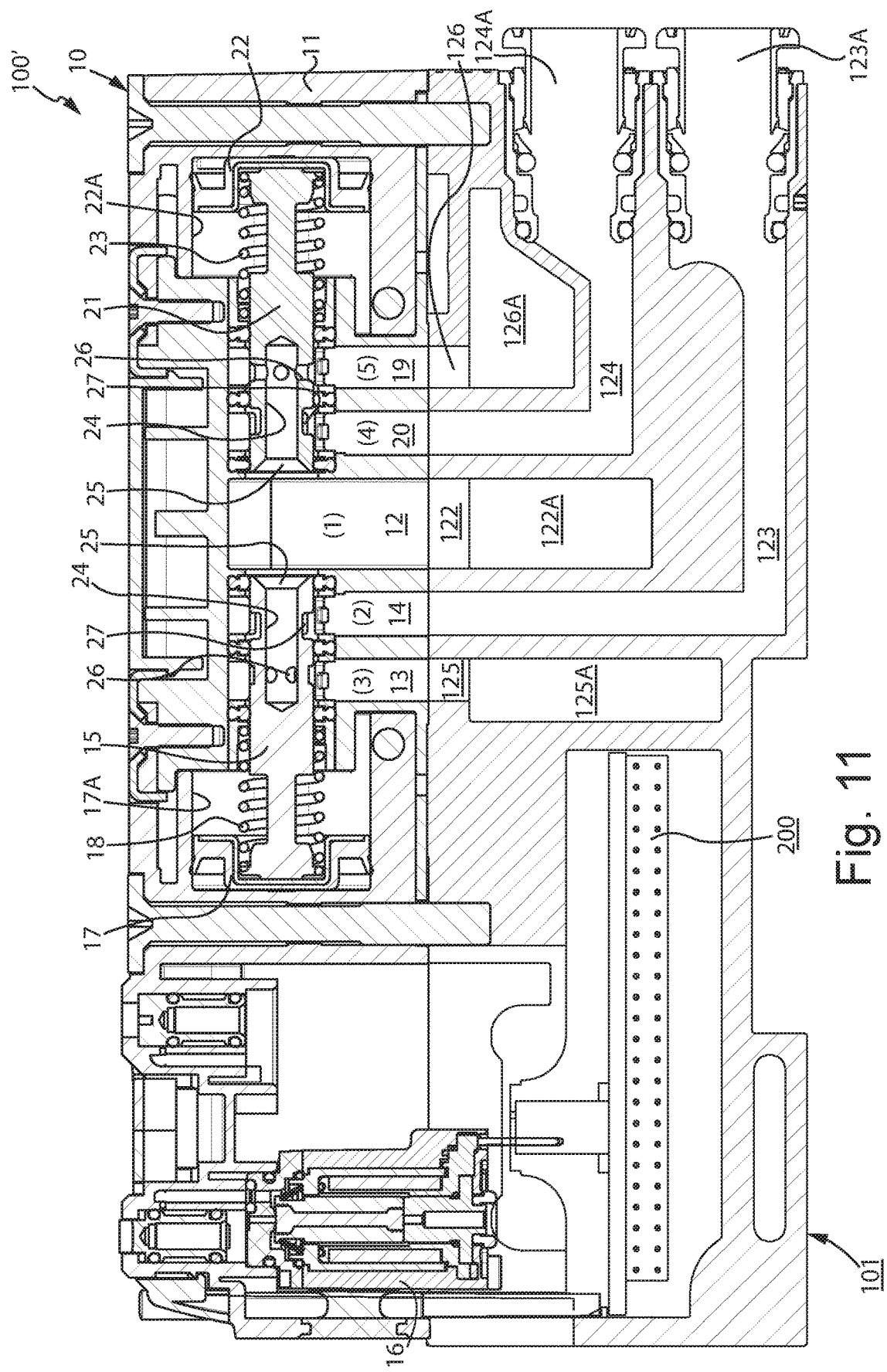
FIG. 11 is a section view of the solenoid valve system of FIG. 10 taken at the shut-off solenoid valve.

The solenoid valve system 100' is of the type described in the introductory part of the present description and as shown, for example, in FIGS. 1 and 2, whose components are shown again respectively in FIGS. 10 and 11 and whose description is understood to be entirely referred to herein.

In the accompanying drawings and in the present description, equal reference numbers indicate equal or mutually equivalent elements.

In the present description and in the accompanying figures, in addition to the reference numbers of the various elements, the numberings will also be used which, according to the unified classification, identify the mouths of the solenoid valves of the spool type, i.e.: "(1)" (feeding mouth), "(2)" and "(4)" (outlet mouths) and "(3)" and "(5)" (discharge mounts), in the general meaning indicated in the foreword to the present description.

In the following description, "pressurised fluid" means "pressurised air".

In general terms, the idea on which the present invention is based is to realise a shut-off solenoid valve 10 that is interchangeable with any solenoid valve of a known solenoid valve system 100', for example the one shown in FIG. 1 and in FIGS. 10 and 11.

The shut-off solenoid valve 10 according to the present invention, then, has such a number and arrangement of mouths as to be able to be coupled to any of the housings of the base of the solenoid valve system to which is usually coupled a solenoid valve that equips the solenoid valve system itself. Hence, it can be coupled to the base of the solenoid valve system without the use of a dedicated base module and it can be coupled at any housing, i.e. in any position, of the base of the solenoid valve system that is known in itself.

It should be specified that the term "base" also means each portion or section of base, also of a modular type, into which a same solenoid valve system can be divided and each operating at a different pressure; the term "base" will be used only for the sake of simplicity.

Adopting, then, the terminology and the nomenclature normally used to indicate the corresponding mouths of a usual solenoid valve, the shut-off solenoid valve 10 according to the present invention has:

at least one feeding mouth (1) that is coupleable in fluid communication with the feeding duct defined at one of the housings of the base of the solenoid valve system, which feeding duct is joined to or is defined by a segment of a main feeding duct obtained in the base and which distributes the compressed air to the various housings obtained in the base;

at least a first outlet mouth (2) which is coupleable in fluid communication with the first outlet duct defined at one of the housings of the base of the solenoid valve system, first outlet duct that ends in a corresponding first delivery opening accessible from outside the base and adapted to be usually coupled or joined to a user;

at least a first discharge mouth (3) which is coupleable in fluid communication with the first discharge duct defined at one of the housings of the base of the solenoid valve system, first discharge duct that is joined to or is defined by a segment of a first main discharge duct obtained in the base and which discharges the compressed air returning from the individual users.

According to the present invention, the shut-off solenoid valve 10 is configured in such a way that:

the feeding mouth (1), which usually receives at the inlet the compressed air coming from the main feeding duct of the base, is instead used to feed the compressed air in the main feeding duct of the base or to discharge it therefrom, and the first outlet mouth (2), which usually sends the compressed air to the user connected to the first delivery opening of the corresponding first outlet duct of the base with which it is in fluid connection, is instead used to receive the compressed air fed by a feeding source. This feeding source is connected in fluid communication with the first delivery opening of the first outlet duct of the base with which the first outlet mouth (2) of the shut-off solenoid valve 10 is in fluid communication; the feeding source in fact constitutes "the user" connected to at least one delivery opening of the housing of the base whereat the shut-off solenoid valve 10 is coupled.

Essentially, in the shut-off solenoid valve 10:
the mouth that in the usual solenoid valve constitutes the actual feeding mouth (1) actually serves as an outlet mouth, through which the compressed air is supplied into the main feeding duct of the base and through which said main feeding duct of the base is put in discharge; in the present description and in the claims said mouth will be indicated as "controlled feeding mouth" and, to maintain the correspondence with the mouths of the other usual solenoid valves, in particular with regard to the connection with the circuit defined in the base, it will be designated with the numeral (1);

the at least one mouth that in the usual solenoid valves constitutes at least one of the outlet mouth (2), (4) actually serves as a feeding mouth; it does not send the compressed air towards a user connected to the solenoid valve, but it receives at the inlet the air from the feeding source S; in the present description and in the claims said mouth will be indicated as "controlled outlet mouth" and, to maintain the correspondence with the mouths of the other usual solenoid valve, in particular with regard to the connection with the circuit defined in the base, it will be designated with the numerals (2), (4).

To obtain this functionality, the shut-off solenoid valve 10 is so configured that its controlled feeding mouth (1) is alternatively and selectively in fluid communication respectively with its first discharge mouth (3), bypassing or isolating its first controlled outlet mouth (2), and with its first controlled outlet mouth (2), bypassing or isolating its first discharge mouth (3).

It should be noted that, unlike in the usual solenoid valves, in the shut-off solenoid valve 10, its first controlled outlet mouth (2) is never in fluid communication with its first discharge mouth (3).

The shut-off solenoid valve 10 according to the present invention then assumes:

a resting or non-active position, in which its controlled feeding mouth (1) is in fluid communication with its first discharge mouth (3), bypassing or isolating its first controlled outlet mouth (2); the first controlled outlet mouth (2) being connected to the compressed air feeding source S, and the controlled feeding mouth (1) connected to the main feeding duct of the base, the entire circuit of the solenoid valve system is put in discharge; as will be more readily apparent below, if the shut-off solenoid valve 10 is also provided with a second discharge mouth (5), which is associatable in fluid communication with a second discharge duct which ends at the same housing of the base whereat the shut-off solenoid valve 10 is mounted and that joins or is defined by a segment of a second main discharge duct obtained in the base, when the shut-off solenoid valve 10 is in its resting or non-active position, its controlled feeding mouth (1) is necessarily in fluid communication also with said second discharge mouth (5);

at least a first working or active position, in which its controlled feeding mouth (1) is in fluid communication with its first controlled outlet mouth (2), bypassing or isolating, its first outlet mouth (3) and, when present, also its second outlet mouth (5); the first controlled outlet mouth (2) being connected to the compressed air feeding source S, and the controlled feeding mouth (1) connected to the main feeding duct of the base, the compressed air is fed into the entire circuit of the solenoid valve system.

In a possible embodiment, the shut-off solenoid valve 10 according to the present invention further comprises:

at least a second controlled outlet mouth (4), which is coupleable in fluid communication with the second outlet duct defined at each of the housings of the base of the solenoid valve system, second outlet mouth that ends in a corresponding second delivery opening accessible from outside the base and that is adapted to be usually coupled or joined to a user;

at least a second discharge mouth (5), which is coupleable in fluid communication with the second discharge duct defined at each of the housings of the base of the solenoid valve system, second discharge duct that joins or is defined by a segment of a second main discharge duct obtained in the base.

In this case, the shut-off solenoid valve 10 is so configured that its controlled feeding mouth (1) is alternatively and selectively in fluid communication also and respectively with its second discharge mouth (5), bypassing or isolating its second controlled outlet mouth (4), and with its second controlled outlet mouth (4), bypassing or isolating its second discharge mouth (5).

Figure 5:
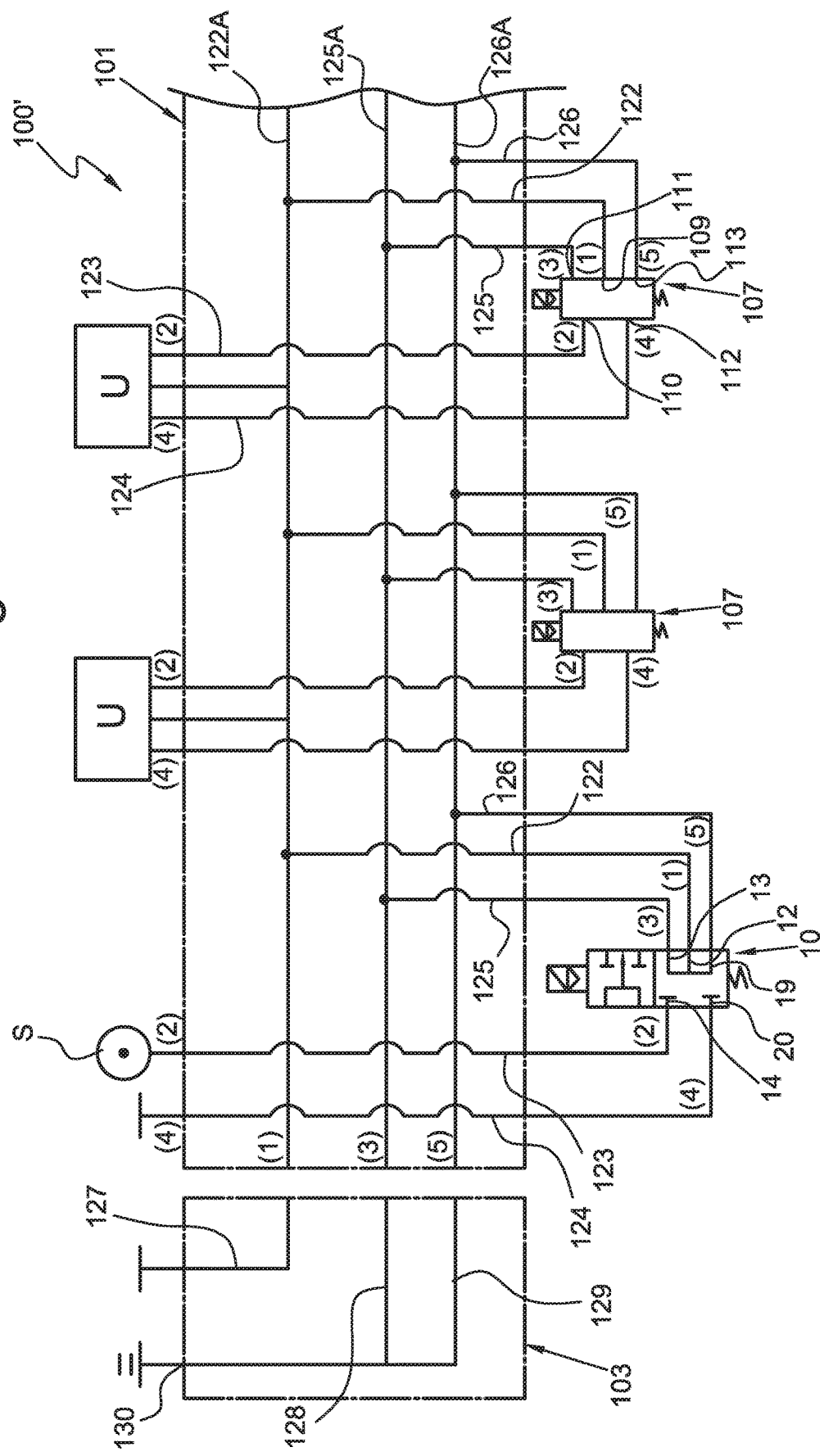
FIG. 5 is a schematic diagram of the circuit of a solenoid valve system like the one of FIG. 1 including a shut-off solenoid valve according to a possible embodiment of the present invention.
Figure 6:
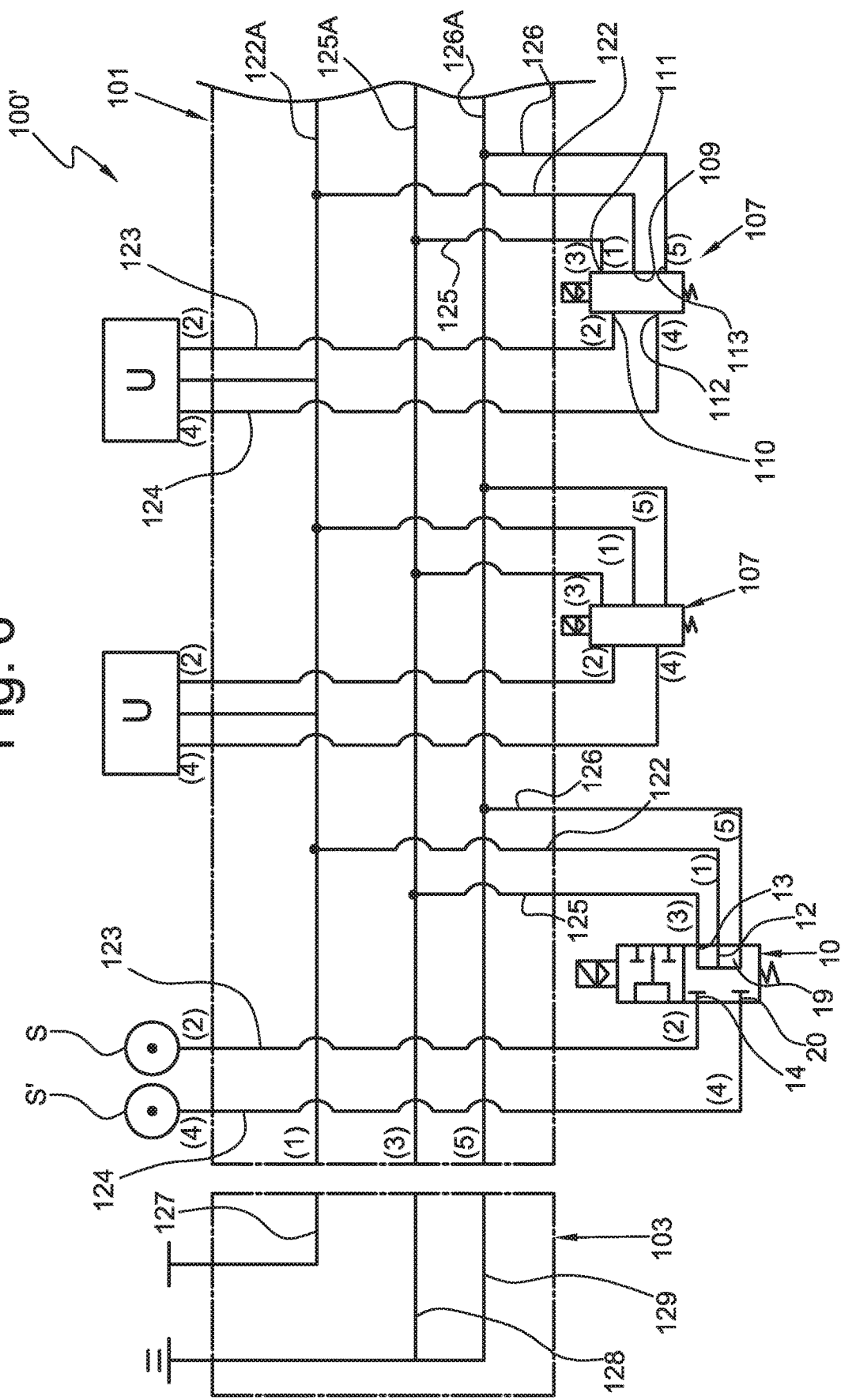
FIG. 6 is a schematic diagram of the circuit of a solenoid valve system like the one of FIG. 1 including a shut-off solenoid valve according to an additional possible embodiment of the present invention.

The second controlled outlet mouth (4) of the shut-off solenoid valve 10 can be closed, i.e. not connected to any feeding source of compressed air (FIG. 5), or used together with the first controlled outlet mouth (2) to receive the compressed air fed by a feeding source S' so as to double the flow rate of compressed air into the circuit of the solenoid valve system (FIG. 6). In this latter case, a feeding source S' is connected in fluid communication with the second delivery opening of the second outlet duct of the base with which the second controlled outlet mouth (4) of the shut-off solenoid valve 10 is in fluid communication; the feeding source S' in fact constitutes the "user" connected to the housing of the base whereat the shut-off solenoid valve 10 is coupled. A same feeding source can be coupled in fluid communication with both the first delivery opening and the second delivery opening respectively of the first outlet duct and of the second outlet duct of the housing of the base whereat the shut-off solenoid valve 10 is coupled, for example through a Y-shaped coupling of the type described in WO2017/017560.

In this possible embodiment, when the shut-off solenoid valve 10 is in its resting or non-active resting position, its controlled feeding mouth (1) is in fluid communication both with its first discharge mouth (3) and with its second discharge mouth (5), bypassing or isolating its first controlled outlet mouth (2) and its second controlled outlet mouth (4); the entire circuit of the solenoid valve system is put in discharge, the feeding source S, S' being connected to the first controlled outlet mouth (2) and possibly also to the second controlled outlet mouth (4), both bypassed and isolated.

When the shut-off solenoid valve 10 is in its first working or active position, its controlled feeding mouth (1) is in fluid communication both with its first controlled outlet mouth (2) and with its second controlled outlet mouth (4), bypassing or isolating its first discharge mouth (3) and its second discharge mouth (5). Being at least the first controlled outlet mouth (2) connected to the compressed air feeding source S, and its controlled feeding mouth (1) connected to the main feeding duct of the base, the compressed air is fed into the entire circuit of the solenoid valve system. When the feeding source S' is also connected to the second controlled outlet mouth (4) of the shut-off solenoid valve 10, the flow rate of the compressed air fed into the circuit of the solenoid valve system is increased.

It is also possible to increase the flow rate of compressed air into the circuit defined by the solenoid valve system using more than one shut-off solenoid valve 10 as described above, the two or more shut-off solenoid valves 10 being arranged in different positions of the base.

In practice, since the solenoid valves of the solenoid valve system are of the spool type, the shut-off solenoid valve 10 according to the present invention is of the spool type whose mouths are arranged so as to connect to the ducts defined at each housing of the base and whose at least one spool-type slider is provided with fluid connection means so configured as to realise the fluid connections described above between its controlled feeding mouth, its first and its second discharge mouth and its first and its second controlled outlet mouth.

More in detail, in the accompanying figures from 5 to 12 the number 10 designates a shut-off solenoid valve according to the present invention applied to a solenoid valve system 100' generally known in itself and as generally described in relation to FIGS. 1 and 2, whose description is fully referred to herein, equal reference numbers being referred to the same elements.

According to the present invention, at least one of the solenoid valves 107 is replaced by a shut-off solenoid valve 10 according to the present invention, or at least at one housing 106 of the base modules 101, 102 a shut-off solenoid valve 10 is mounted.

The shut-off solenoid valve 10 is thus interchangeable with any solenoid valve 107, being it configured with such a number and disposition of mouths as to be coupleable to the base, or to the base modules 101, 102, at any of the housings 106 as described above.

The shut-off solenoid valve 10 is of the spool type and comprises:
  a body 11 in which there are obtained:
    at least one controlled feeding mouth 12 which is coupleable in fluid communication with the feeding duct 122 of the respective housing 106,
    at least one first discharge mouth 13 which is coupleable in fluid communication with the corresponding first discharge duct 125 of said respective housing 106, and
    at least one first controlled outlet mouth 14 which is coupleable in fluid communication with the corresponding first outlet duct 123 of said respective housing 106,
  at least one first spool-type slider 15 which is housed in a movable manner with an alternate rectilinear motion in a seat obtained in the body 11 and which is configured to selectively fluidly connect said at least one controlled feeding mouth 12, said at least one first discharge mouth 13 and said at least one first controlled outlet mouth 14, and
  at least a first actuation device of the first spool-type slider 15.

The first actuation device comprises a first electropilot 16 which commands a first actuating piston 17 integral with the first spool-type slider 15 and housed in a respective first chamber 17A.

The shut-off solenoid valve 10 further comprises a first repositioning device which, for example, is of the mechanical type and it consists of a first spring 18 acting on the first actuating piston 17.

In a preferred embodiment, the shut-off solenoid valve 10 further comprises:
  a second outlet mouth 19, which is obtained in the body 11 and is coupleable in fluid communication with the second discharge duct 126 of the corresponding housing 106,
  a second controlled outlet mouth 20, which is obtained in the body 11 and is coupleable in fluid communication with the second outlet duct 124 of the corresponding housing 106,
  a second spool-type slider 21 which is housed in a movable manner with an alternate rectilinear motion in a seat obtained in the body 11 and which is configured to selectively fluidly connect the controlled feeding mouth 12, the second discharge mouth 19 and the second controlled outlet mouth 20, at least a second actuation device of the second spool-type slider 21, and at least a second repositioning device of the second spool-type slider 21.

The first spool-type slider 15 and the second spool-type slider 21 are distinct and separate from each other.

Preferably, the second actuation device is also of the electro-pneumatic type, comprising an electropilot that commands a second actuating piston 22 integral with the second spool-type slider 21 and housed in a respective chamber 22A. Advantageously, the second actuation device shares the electropilot 16 with the first actuation device, i.e. the electropilot 16 commands both the first actuating piston 17 and the second actuating piston 22. However, the second actuation device may comprise an electropilot distinct from the electropilot 16.

In a preferred embodiment, the second repositioning device is of the mechanical type and comprises a second spring 23 acting on the second actuating piston 22.

Also possible, however, are different embodiments of the actuation devices, of the type comprising an electropilot, and of the repositioning devices, which for example could also be of the type comprising electropilots.

According to the present invention, the first spool-type slider 15 of the shut-off solenoid valve 10 is provided with fluid connection means configured to put in fluid communication the controlled feeding mouth 12 alternatively and selectively with the first discharge mouth 13 and with the first controlled outlet mouth 14 following the movement of the first spool-type slider 15 itself, the first controlled outlet mouth 14 being coupled in fluid communication with a source S for feeding the pressurised fluid. Said feeding source S is coupled to the first delivery opening 123A of the first outlet duct 123 of the housing 106 of the base whereat the shut-off solenoid valve 10 is coupled.

If the shut-off solenoid valve 10 also comprises its second spool-type slider 21, the latter, too, is provided with similar fluid connection means configured to put in fluid communication the controlled feeding mouth 12 alternatively and selectively with the second discharge mouth 19 and with the second controlled outlet mouth 20 following the movement of the second spool-type slider 21, the second controlled outlet mouth 20 being able to be closed or also coupled in fluid communication with a source S' for feeding the pressurised fluid. In the latter case, said feeding source S' is coupled to the second delivery opening 124A of the second outlet duct 124 of the housing 106 of the base whereat the shut-off solenoid valve 10 is coupled. The two feeding sources S and S' can be mutually distinct (but at the same pressure) or coincide and be connected to the first delivery opening 123A and to the second delivery opening 124A through a Y-shaped coupling.

The fluid connection means of the first spool-type slider 15 comprise:

at least one passage 24 obtained in the first spool-type slider 15 and which ends in at least a first opening 25 that is constantly in fluid communication with the controlled feeding mouth 12 and in at least a second opening 26 which, following the movement of the first spool-type slider 15, is selectively and alternatively put in fluid communication with the first discharge mouth 13 and with the first controlled outlet mouth 14.

In the embodiment represented in the accompanying figures, the ducts of each housing 106 are arranged aligned to each other in succession with the discharge duct 122 in central position, the first outlet duct 123 and the second outlet duct 124 arranged at the sides of the feeding duct 122 and the first discharge duct 125 and the second discharge duct 126 at the side of the respective first outlet duct 123 and second outlet duct 124. Clearly, the mouths of the solenoid valves 107 that have to be coupled therewith have the same arrangement; hence, the same arrangement is observed in the shut-off solenoid valve 10.

In this embodiment, the passage 24 consists of an axial hole obtained in the first spool-type slider 15. Said axial hole has a blind bottom and is obtained at the end of the first spool-type slider 15 opposite to the one integral with the first actuating piston 17. The open of said hole constitutes the first opening 25 that is constantly in fluid communication with the controlled feeding mouth 12. The first opening 25 could consist of one or more holes transverse to the axial hole and ending at the controlled feeding mouth 12.

The at least one second opening 26 consists, instead, of at least one respective transverse hole that is obtained in the first spool-type slider 15 and whose opposite ends are open and in fluid communication respectively with the axial hole forming the passage 24 and, following the movement of the first spool-type slider, selectively and alternatively with the first discharge mouth 13 and with the first controlled outlet mouth 14. Said second transverse holes, which define the second openings 26, are obtained at the end of the axial hole defining the passage 24 opposite to the one ending in the first opening 25. Advantageously, the passage 24 comprises a plurality of second openings 26 each consisting of a respective hole transverse to the axial hole defining the passage 24.

The fluid connection means further comprise at least one section of the first spool-type slider 15 with reduced diameter with respect to the predefined diameter of the first spool-type slider so as to form at least one corresponding cavity 27 configured to put in fluid communication the controlled feeding mouth 12 with the first controlled outlet mouth 14 when the shut-off solenoid valve 10 is in its working position.

The second spool-type slider 21 is provided with similar fluid connection means as described above which, in the accompanying drawings, are designated with the same reference numbers.

Between the body 11 and the first spool-type slider 15, as well as between the body 11 and the second spool-type slider 21, are interposed sealing gaskets 28, 29, 30, 31, 32 and 33.

The sealing gaskets 28, 29, 30 and 31 are arranged to isolate the first controlled outlet mouth 14 and the second controlled outlet mouth 20 from the controlled feeding mouth 12 and respectively from the first discharge mouth 13 and from the second discharge mouth 19, when the shut-off solenoid valve 10 is in its resting position.

The sealing gaskets 32, 28, 31 and 33 are arranged to isolate the first discharge mouth 13 and the second discharge mouth 19 from the controlled feeding mouth 12 and respectively from the first controlled discharge mouth 14 and from the second controlled outlet mouth 20, when the shut-off solenoid valve 10 is in its working position.

The sealing gaskets 32 and 33, moreover, are arranged to isolate the first actuating piston 17 and the second actuating piston 22, or the respective chambers 17A and 22A, from the mouths of the shut-off solenoid valve 10.

Figure 9:
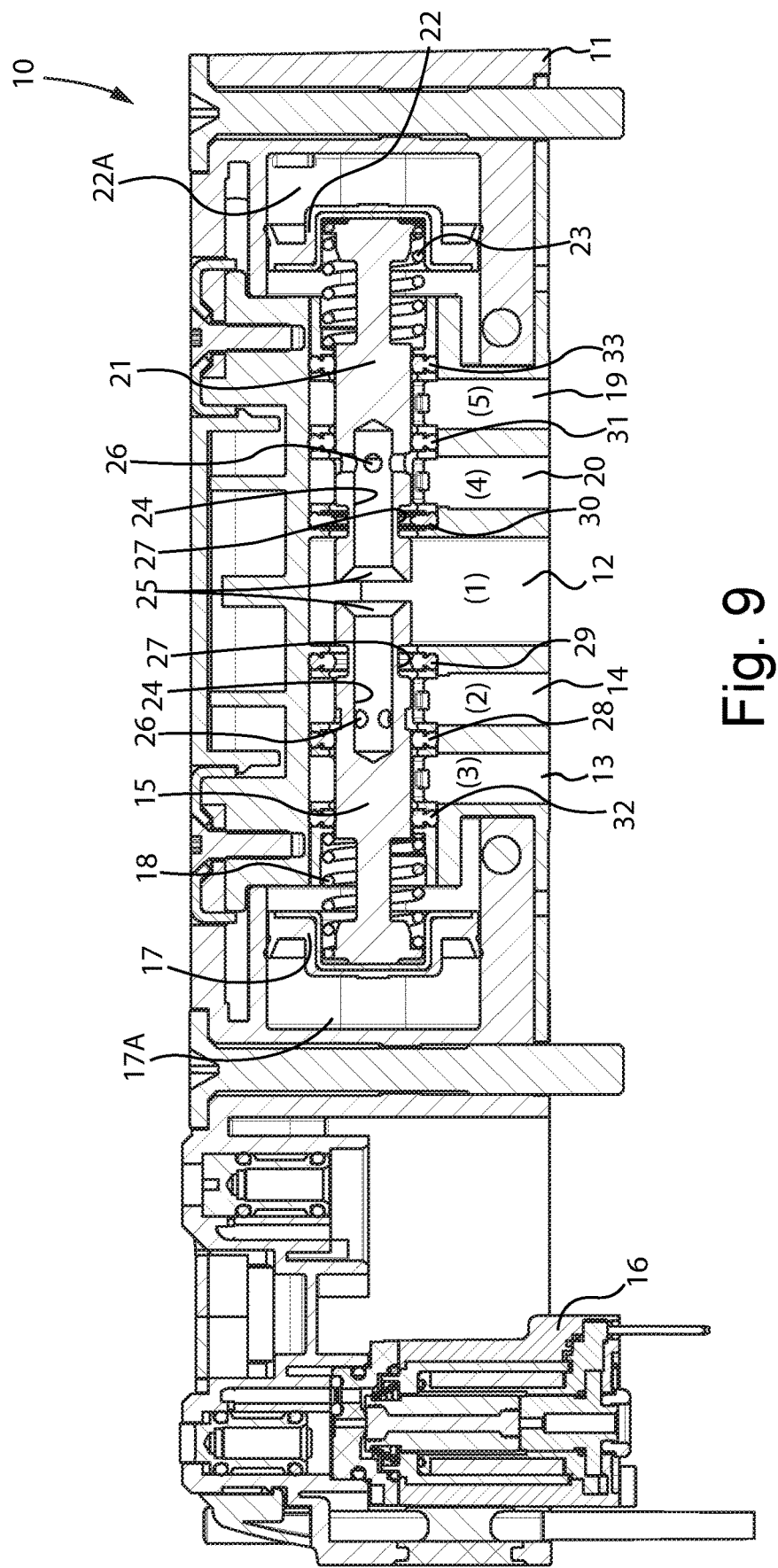
FIG. 9 is a view like the one of FIG. 8 showing the shut-off solenoid valve in working or actuated position.

The shut-off solenoid valve 10 assumes at least two positions:

a resting position (FIGS. 8, 11 and 12), in which the controlled feeding mouth 12 is in fluid communication with the first discharge mouth 13, bypassing and/or isolating the first controlled outlet mouth 14, and with the second discharge mouth 19, bypassing and/or isolating the second controlled outlet mouth 20; the first controlled outlet mouth 14 and the second controlled outlet mouth 20 are isolated by the gaskets 28, 29, 30 and 31;

at least one working position (FIG. 9), in which the controlled feeding mouth 12 is in fluid communication with the first controlled outlet mouth 14, bypassing and/or isolating the first discharge mouth 13, and with the second controlled outlet mouth 20, bypassing and/or isolating the second discharge mouth 19; the first discharge mouth 13 and the second discharge mouth 19 are isolated by the gaskets 32, 28, 31 and 33.

When the shut-off solenoid valve 10 is in its working position, the controlled feeding mouth 12 is in fluid communication with the first controlled outlet mouth 14 and with the second controlled outlet mouth 20 through the spaces that are created between the cavity 27 respectively of the first spool-type slider 15 and of the second spool-type slider 21 and the respective gaskets 29 and 30, as well as through the second openings 26 of the passage 24 obtained in each of the first spool-type slider 15 and of the second spool-type slider 21.

The shift from the resting position to the working position of the shut-off solenoid valve 10 is commanded by the first electropilot 16 which, when energised, commands the feeding of pressurised air concurrently in the chambers 17A, 22A in which are housed respectively the first actuating piston 17 and the second actuating piston 22, which push the first spool-type slider 15 and the second spool-type slider 21 in opposite motions along the same sliding direction approaching the centre of the body 11.

The shift from the working position to the resting position of the shut-off solenoid valve 10 takes place as a result of the thrust exercised by the first spring 18 and by the second spring 23 respectively on the first actuating piston 17 and on the second actuating piston 22, the first electropilot 16 being de-energised. The first actuating piston 17 and the second actuating piston 22, and with them the first spool-type slider 15 and the second spool-type slider 21, are thus thrust in opposite motions along the same sliding direction away from the centre of the body 11.

The first electropilot 16 is in turn commanded by input signals that are transmitted through the same electronic board 200 or otherwise by an electric or electronic circuit and the same electric connection means that already equip the base of the solenoid valve system 100' and that are not described in detail, being known to the person skilled in the art.

When the shut-off solenoid valve 10 is in its resting position, the entire circuit of the solenoid valve system 100 is put in discharge.

In fact, the feeding source S, S' of the solenoid valve system 100' is in fluid communication with the first controlled outlet mouth 14 and possibly also with the second controlled outlet mouth 20 of the shut-off solenoid valve 10. When the shut-off solenoid valve 10 is in its resting position, these controlled outlet mouths 14, 20 are isolated from the circuit downstream of them, blocking the entry of the feed air coming from the source S, S' in the main feeding duct 122A of the base. The main feeding duct 122A and therewith all the feeding ducts 122 of the housings 106 are instead connected to the discharge.

When the shut-off solenoid valve 10 is in its working position, the entire circuit of the solenoid valve system 100' is fed with the compressed air through the shut-off solenoid valve 10 itself. In fact, the feeding source S, S' of the solenoid valve system 100 is in fluid communication with the first controlled outlet mouth 14 and possibly also with the second controlled outlet mouth 20 of the shut-off solenoid valve 10, which, when the shut-off solenoid valve 10 is in its working position, are in communication with the controlled feeding mouth 12 and, hence, with the circuit downstream of it. The compressed air coming from the source S, S' is injected into the main feeding duct 122A of the base through the controlled outlet mouths 14, 20 and the controlled feeding mouth 12 of the shut-off solenoid valve 10, whose first discharge mouth 13 and second discharge mouth 19 are isolated.

It should be noted, in general, that the solenoid valve system 100' comprises, in a known manner, also at least one head element or module 103 as described above in relation to FIG. 1 which is understood to be fully referred to herein.

Using a shut-off solenoid valve 10 according to the present invention in solenoid valve systems 100' comprising a head module 103 as described above, it is evident that the first joining duct 127 must be closed, the respective junction 127A having to be plugged, or altogether absent.

The feeding source S, S' is connected to one or both the first delivery opening 123A and the second delivery opening 124A of the housing 106 whereat is coupled the shut-off solenoid valve 10 and no longer to the head module 103 which, therefore, no longer serves as a feeding module.

Figure 12:
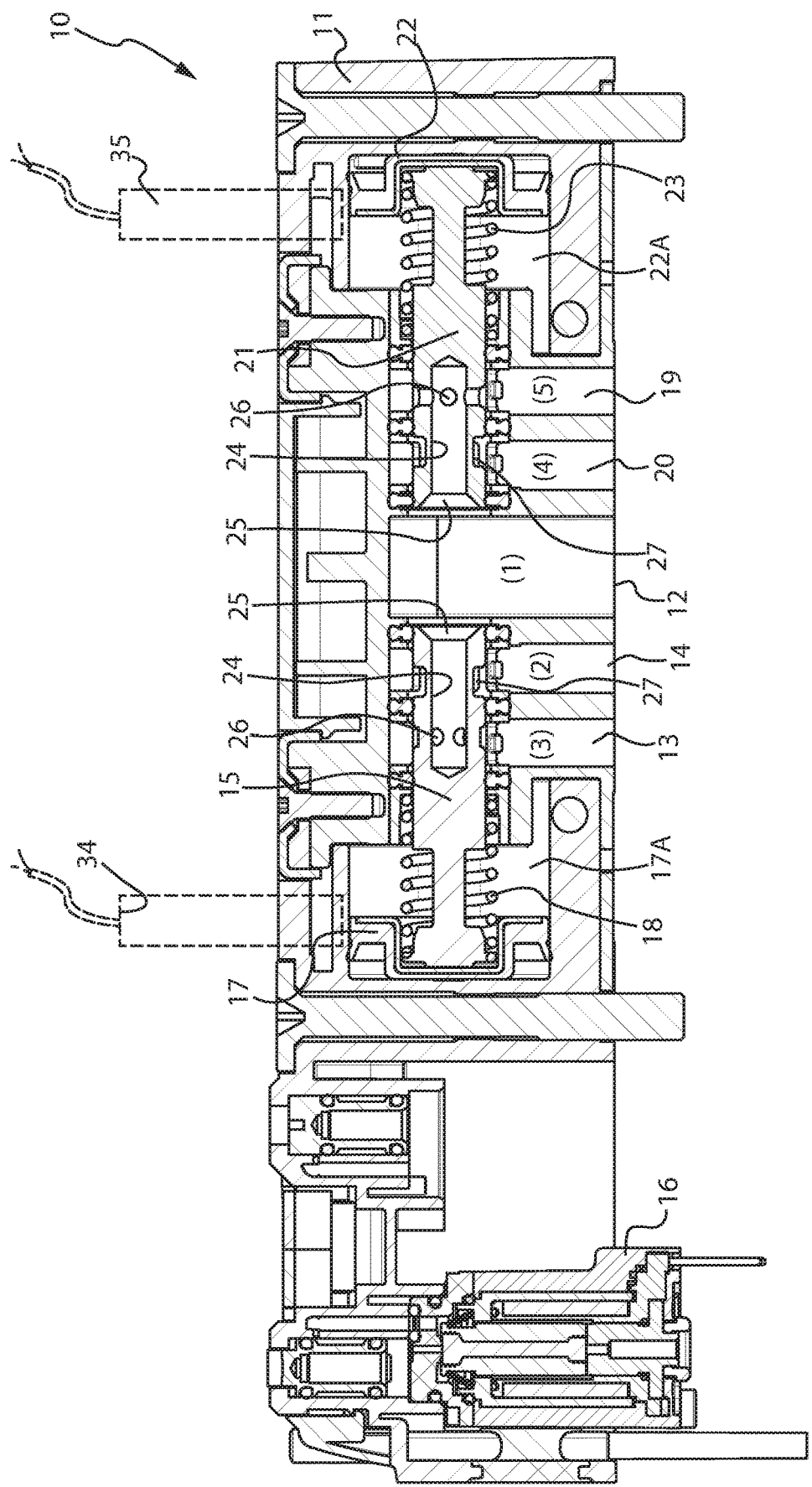
FIG. 12 is a view like the one of FIG. 8 of an alternative embodiment of the shut-off solenoid valve according to the present invention.

FIG. 12 shows a preferred embodiment of the shut-off solenoid valve 10, in which are also provided position sensors 34, 35 of the first spool-type slider 15 and of the possible second spool-type slider 21 configured and arranged to sense the position of the first spool-type slider 15 and of the possible second spool-type slider 21 corresponding to the resting position of the shut-off solenoid valve 10.

This allows to assure a control on the position of the shut-off solenoid valve 10 and in particular of its resting position and consequent placing in discharge of the circuit of the solenoid valve system 100.

The position sensors 34, 35 can be, for example, of the inductive type and interact with the metallic portions of the first actuating piston 17 and of the second actuating piston 22.

The shut-off solenoid valve according to the present invention has the advantage that it can be coupled to the base of a known solenoid valve system, without the use of a dedicated base module, with evident advantages in terms of reduction of the production costs and of simplification of the operations for mounting and dismounting the solenoid valve system.

The shut-off solenoid valve according to the present invention, therefore, is directly integrated in the solenoid valve system, whose overall dimensions are not changed.

The shut-off solenoid valve according to the present invention can be positioned at any housing of the base of known solenoid valve system.

The shut-off solenoid valve according to the present invention can be positioned at any useful position of the base of the solenoid valve system, being interchangeable with the solenoid valves that usually equip the solenoid valve system.

On a same solenoid valve system, it is also possible to apply even more than one shut-off solenoid valve according to the present invention. For example, if it is necessary to increase the flow rate of compressed air to be fed, it is possible to apply to a same solenoid valve system two or more shut-off solenoid valves according to the present invention operating in parallel.

Again, if the solenoid valve system comprises distinct sections that must be fed with compressed air at different pressures, each section can be equipped with one or more shut-off solenoid valve according to the present invention.

The shut-off solenoid valve according to the present invention can be applied to existing solenoid valve systems without any need to make substantial changes thereto.

The shut-off solenoid valve according to the present invention also offers advantages in terms of control and safety.

The circuit shut-off solenoid valve for a solenoid valve system and a solenoid valve system comprising said circuit shut-off solenoid valve are susceptible to modifications and variants, without departing from the same inventive concept; moreover, all details can be replaced with technically equivalent elements. In practice, the materials used, as well as their shapes and dimensions, can be of any type according to the technical requirements.

The invention claimed is:

1. A circuit shut-off solenoid valve for a solenoid valve system, wherein said solenoid valve system comprises a plurality of solenoid valves and at least a base operatively connected to said plurality of solenoid valves,
wherein:
each of said solenoid valves is of the spool type and comprises a body, in which at least one feeding mouth, at least one solenoid valve first discharge mouth and at least one solenoid valve first outlet mouth are obtained, at least one solenoid valve first spool-type slider, which is housed in a movable manner with an alternate rectilinear motion in a seat obtained in said body and is configured to selectively fluidly connect said at least one feeding mouth, said at least one solenoid valve first discharge mouth and said at least one solenoid valve first outlet mouth, and at least one first actuation device of said solenoid valve first spool-type slider comprising at least one solenoid valve first electropilot,
said at least one base comprises a plurality of housings, each of which is adapted to receive said respective solenoid valve, wherein each of said housings comprises at least one feeding duct adapted to be fluidly connected with said feeding mouth of said respective solenoid valve, at least one first discharge duct adapted to be fluidly connected with said solenoid valve first discharge mouth of said respective solenoid valve and at least one first outlet duct placeable in fluid communication with said solenoid valve first outlet mouth of said respective solenoid valve,
the feeding ducts of said housings being joined to or defined by a segment of a main feeding duct obtained in said base,
the first discharge ducts of said housings being joined to or defined by a segment of a first main discharge duct obtained in said base, and
said first outlet ducts of said housings each ending in a respective first delivery opening which is associatable with a user, and
wherein said circuit shut-off solenoid valve is of the spool type which is coupleable to one of said housings of said base, and said circuit shut-off solenoid valve comprises:
a body in which there are obtained:
at least one controlled feeding mouth which is coupleable in fluid communication with the feeding duct of said respective housing,
at least one first discharge mouth which is coupleable in fluid communication with said first discharge duct of said respective housing, and
at least one first controlled outlet mouth which is coupleable in fluid communication with said first outlet duct of said respective housing,
at least one first spool-type slider which is housed in a movable manner with an alternate rectilinear motion in a seat obtained in said body and which is configured to selectively fluidly connect said at least one controlled feeding mouth, said at least one first discharge mouth and said at least one first controlled outlet mouth, and
at least one first actuation device of said first spool-type slider comprising a first electropilot,
said at least one first spool-type slider of said circuit shut-off solenoid valve being provided with fluid connection means configured to alternatively and selectively place said at least one controlled feeding mouth of said circuit shut-off solenoid valve in fluid communication with said at least one first discharge mouth and with said at least one first controlled outlet mouth of said circuit shut-off solenoid valve following the movement of said at least one first spool-type slider, said at least one first controlled outlet mouth of said circuit shut-off solenoid valve being coupleable in fluid communication with a feeding source of said pressurized fluid which is connectable to the first delivery opening of said first outlet duct of the respective housing of said base to which said circuit shut-off solenoid valve is coupleable.

2. The circuit shut-off solenoid valve according to claim 1, wherein, in a rest position thereof, said at least one controlled feeding mouth thereof is in fluid communication with said at least one first discharge mouth thereof, by-passing and/or isolating said at least one first controlled outlet mouth thereof, and,
wherein, in at least one working position thereof, said at least one controlled feeding mouth thereof is in fluid communication with said at least one first controlled outlet mouth thereof, by-passing and/or isolating said at least one first discharge mouth thereof.

3. The circuit shut-off solenoid valve according to claim 2, wherein said fluid connection means of said at least one first spool-type slider thereof comprise at least a section of said at least one first spool-type slider having a diameter smaller than the predefined diameter of said first spool-type slider so as to form at least one corresponding cavity arranged to place said at least one controlled feeding mouth thereof in fluid communication with said at least one first controlled outlet mouth thereof when said circuit shut-off solenoid valve is in said working position thereof.

4. The circuit shut-off solenoid valve according to claim 2, wherein said circuit shut-off solenoid valve comprises position sensors associated with said body and adapted to detect at least the position of said at least one first spool-type slider corresponding to said rest position of said circuit shut-off solenoid valve.

5. The circuit shut-off solenoid valve according to claim 1, wherein said fluid connection means of said at least one first spool-type slider thereof comprise at least one passage which is obtained in said at least one first spool-type slider thereof and which ends in at least one first opening which is in constant fluid communication with said at least one controlled feeding mouth thereof and in at least one second opening that, following the movement of said at least one first spool-type slider, is selectively and alternatively place in fluid communication with said at least one first discharge mouth thereof and with said at least one first controlled outlet mouth thereof.

6. The circuit shut-off solenoid valve according to claim 5, wherein:
said at least one passage consists of an axial hole obtained in said at least one first spool-type slider thereof,
said at least one first opening consists of an open end of said axial hole or of at least a corresponding first transverse hole which is obtained in said at least one first spool-type slider and whose opposite ends are open and in constant fluid communication with said axial hole and with said at least one controlled feeding mouth thereof, respectively, and
said at least one second opening consists of at least one respective second transverse hole which is obtained in said at least one first spool-type slider and whose opposite ends are open, one being in constant fluid communication with said axial hole and the other, following the movement of said at least one first spool-type slider, being selectively and alternatively in fluid communication with said at least one first discharge mouth thereof and with said at least one first controlled outlet mouth thereof.

7. The circuit shut-off solenoid valve according to claim 1, wherein said solenoid valve system comprises at each of said housings of said base a second discharge duct adapted to be fluidly connected with a second discharge mouth of said one respective solenoid valve and at least one second outlet duct placeable in fluid communication with a second outlet mouth of said respective solenoid valve,
wherein:
said at least one second discharge duct being joined to or defined by a segment of a second main discharge duct obtained in said base, and
said at least one second outlet duct ending in a respective second delivery opening which is associatable with a user,
wherein said circuit shut-off solenoid valve is characterized in that:
in said body thereof there are also obtained at least one second discharge mouth, which is coupleable in fluid communication with said second discharge duct of the respective housing of said base, and at least one second controlled outlet mouth, which is coupleable in fluid communication with said second outlet duct of the respective housing of said base, the respective second delivery opening of the second outlet duct of said housing, to which said circuit shut-off solenoid valve is coupleable, being closable or associable in fluid communication with a feeding source of said pressurized fluid,
a second spool-type slider which is housed in a movable manner with an alternate rectilinear motion in a seat obtained in said body thereof and which is configured to selectively fluidly connect said at least one controlled feeding mouth thereof, said at least one second discharge mouth thereof and said at least one second controlled outlet mouth thereof, and
at least one second actuation device of said second spool-type slider, and
wherein said second spool-type slider is provided with said respective fluid connection means configured to alternatively and selectively place said at least one controlled feeding mouth of said circuit shut-off solenoid valve in fluid communication with said at least one second discharge mouth and with said at least one second controlled outlet mouth of said circuit shut-off solenoid valve following the movement of said at least one second spool-type slider.

8. The circuit shut-off solenoid valve according to claim 7, wherein, in said rest position thereof, said at least one controlled feeding mouth thereof is in fluid communication also with said at least one second discharge mouth thereof, by-passing and/or isolating said at least one second controlled outlet mouth thereof, and, in said at least one working position thereof, said at least one controlled feeding mouth thereof is in fluid communication also with said at least one second controlled outlet mouth thereof, by-passing and/or isolating said at least one second discharge mouth thereof.

9. The circuit shut-off solenoid valve according to claim 7, wherein said second actuation device of said second spool-type slider shares said first electropilot with said first actuation device of said first spool-type slider.

10. A solenoid valve system comprising a plurality of solenoid valves and at least a base operatively connected with said plurality of solenoid valves,
wherein:
each of said solenoid valves is of the spool type and comprises a body, in which at least one feeding mouth, at least one solenoid valve first discharge mouth and at least one solenoid valve first outlet mouth are obtained, at least one solenoid valve first spool slider, which is housed in a movable manner with an alternate rectilinear motion in a seat obtained in said body and is configured to selectively fluidly connect said at least one feeding mouth, said at least one solenoid valve first discharge mouth and said at least one first outlet mouth, and at least one first actuation device of said first spool-type slider comprising at least one solenoid valve first electropilot,
said at least one base comprises a plurality of housings, each of which is adapted to receive said respective solenoid valve, wherein each of said housings comprises at least one feeding duct adapted to be fluidly connected with said feeding mouth of said respective solenoid valve, at least one first discharge duct adapted to be fluidly connected with said solenoid valve first discharge mouth of said respective solenoid valve and at least one first outlet conduit adapted to be placed in fluid communication with said first outlet mouth of said respective solenoid valve,
the feeding ducts of said housings being joined to or defined by a segment of a main feeding duct obtained in said base,
the first discharge ducts of said housings being joined to or defined by a segment of a first main discharge duct obtained in said base, and
said first outlet ducts of said housings each ending in a respective first delivery opening which is associatable with a user, and
wherein said solenoid valve system comprises at least one circuit shut-off solenoid valve, which is coupled to one of said housings, said circuit shut-off solenoid valve comprises:
a body in which there are obtained:
at least one controlled feeding mouth which is coupled in fluid communication with the feeding duct of said respective housing,
at least one first discharge mouth which is coupled in fluid communication with said first discharge duct of said respective housing, and
at least one first controlled outlet mouth which is coupled in fluid communication with said first outlet duct of said respective housing, at least one first spool-type slider that is housed in a movable manner with an alternate rectilinear motion in a seat obtained in said body and which is configured to selectively fluidly connect said at least one controlled feeding mouth, said at least one first discharge mouth and said at least one first controlled outlet mouth, and at least one first actuation device of said first spool-type slider comprising a first electropilot, said at least one first spool-type slider of said circuit shut-off solenoid valve being provided with a fluid connection configured to alternatively and selectively place said at least one controlled feeding mouth of said circuit shut-off solenoid valve in fluid communication with said at least one first discharge mouth and with said at least one first controlled outlet mouth of said circuit shut-off solenoid valve following the movement of said at least one first spool-type slider, wherein said at least one first controlled outlet mouth of said circuit shut-off solenoid valve is coupled in fluid communication with a feeding source of said pressurized fluid that is connected with the first delivery opening of the first outlet duct of the respective housing to which said circuit shut-off solenoid valve is coupled.

11. The solenoid valve system according to claim 10, wherein:

at least one of said solenoid valves further comprises at least one second discharge mouth and at least one second outlet mouth which are obtained in said respective body, at least one second spool-type slider, different from or coinciding with said first spool-type slider, which is housed in a movable manner with an alternate rectilinear motion in a seat obtained in said body and which is configured to selectively fluidly connect said at least one feeding mouth, said at least one second discharge mouth and said at least one second outlet mouth, and at least one second actuation device of said second spool-type slider, different from or coinciding with said first actuation device of said first spool-type slider, the respective at least one housing of said base further comprises a second discharge duct adapted to be fluidly connected with said second discharge mouth of said respective at least one solenoid valve and at least one second outlet duct adapted to be placed in fluid communication with said second outlet mouth of said respective at least one solenoid valve, said at least one second discharge duct being joined to or defined by a segment of a second main discharge duct obtained in said base, and said at least one second outlet duct ending in a respective second delivery opening which is associatable to the user.

12. The solenoid valve system according to claim 10, wherein said solenoid valve system comprises at each of said housings of said base a second discharge duct adapted to be fluidly connected with a second discharge of said one respective solenoid valve and at least one second outlet duct placeable in fluid communication with a second outlet mouth of said respective solenoid valve, wherein:

said at least one second discharge duct being joined to or defined by a segment of a second main discharge duct obtained in said base, and said at least one second outlet duct ending in a respective second delivery opening which is associatable with the user, wherein said circuit shut-off solenoid valve is characterized in that:

in said body thereof there are also obtained at least one second discharge mouth, which is coupleable in fluid communication with said second discharge duct of the respective housing of said base, and at least one second controlled outlet mouth, which is coupleable in fluid communication with said second outlet duct of the respective housing of said base, the respective second delivery opening of the second outlet duct of said housing, to which said circuit shut-off solenoid valve is coupleable, being closable or associable in fluid communication with a feeding source of said pressurized fluid, a second spool-type slider which is housed in a movable manner with an alternate rectilinear motion in a seat obtained in said body thereof and which is configured to selectively fluidly connect said at least one controlled feeding mouth thereof, said at least one second discharge mouth thereof and said at least one second controlled outlet mouth thereof, and at least one second actuation device of said second spool-type slider, wherein said second spool-type slider is provided with said respective fluid connection means configured to alternatively and selectively place said at least one controlled feeding mouth of said circuit shut-off solenoid valve in fluid communication with said at least one second discharge mouth and with said at least one second controlled outlet mouth of said circuit shut-off solenoid valve following the movement of said at least one second spool-type slider, and wherein the second delivery opening of the second outlet duct of said housing to which said circuit shut-off solenoid valve is coupled, is closed or coupled in fluid communication with a feeding source of pressurized fluid.

13. The solenoid valve system according to one claim 10, comprising a head module in which there is solely obtained at least one first duct that joins with said at least one first main discharge duct of said base, which is in fluid communication with the atmosphere or in which there is also obtained at least one joining duct that joins with said main feeding duct of said base, said joining duct having an inlet, the inlet being occluded.

* * * * *